(12) United States Patent
Lifsey et al.

(10) Patent No.: US 12,228,209 B2
(45) Date of Patent: Feb. 18, 2025

(54) SELF-ALIGNING POWER TRANSMISSION BELTS AND SYSTEMS INCORPORATING THE SAME

(71) Applicant: GATES CORPORATION, Denver, CO (US)

(72) Inventors: Walt Lifsey, Denver, CO (US); Kyle Spring, Denver, CO (US); Thomas S. Moss, III, Englewood, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/240,945

(22) Filed: Aug. 31, 2023

(65) Prior Publication Data
US 2024/0068546 A1 Feb. 29, 2024

Related U.S. Application Data

(60) Provisional application No. 63/402,846, filed on Aug. 31, 2022.

(51) Int. Cl.
*F16H 7/02* (2006.01)

(52) U.S. Cl.
CPC .................. *F16H 7/023* (2013.01)

(58) Field of Classification Search
CPC ....... F16G 1/28; F16H 7/023; F16H 2007/185
USPC .................................................. 474/153, 205
See application file for complete search history.

(56) References Cited

U.S. PATENT DOCUMENTS

| | | | | |
|---|---|---|---|---|
| 376,174 | A * | 1/1888 | Adamson | F16H 7/023 474/167 |
| 2,199,292 | A * | 4/1940 | Pierce | F16H 7/06 305/198 |
| 2,770,977 | A * | 11/1956 | Beckadolph | F16H 55/38 305/167 |
| 3,472,563 | A * | 10/1969 | Irgens | B62D 55/125 305/195 |
| 4,011,766 | A * | 3/1977 | Waugh | F16G 5/06 474/205 |
| 4,541,823 | A * | 9/1985 | Marsh | B29D 29/08 156/138 |
| 4,571,224 | A * | 2/1986 | Arinaga | F16G 1/28 474/205 |
| 4,687,261 | A * | 8/1987 | Atkin | B62D 55/24 305/167 |
| 5,006,096 | A * | 4/1991 | Breher | F16H 7/023 474/205 |
| 5,013,286 | A * | 5/1991 | Breher | F16G 1/28 474/205 |
| 5,209,705 | A * | 5/1993 | Gregg | F16G 1/28 474/204 |
| 5,427,580 | A * | 6/1995 | Ledvina | F01L 1/024 474/84 |
| 5,704,861 | A * | 1/1998 | Feuerborn | F16H 7/023 474/205 |

(Continued)

*Primary Examiner* — Henry Y Liu
(74) *Attorney, Agent, or Firm* — Kevin J. Aiken, Esq.

(57) ABSTRACT

A self-aligning power transmission belt, which may be used in conjunction with a corresponding sprocket, and systems incorporating the self-aligning power transmission belt are described. The self-aligning belt includes a tooth configuration that can eliminate tracking error in belt applications. In some configurations, the self-aligning belt includes two or more rows of teeth, with the teeth in one row being offset from the teeth in a second row.

16 Claims, 5 Drawing Sheets

(56) References Cited

U.S. PATENT DOCUMENTS

| | | | | |
|---|---|---|---|---|
| 6,672,983 B2* | 1/2004 | Mohr | ............ | F16H 7/18 |
| | | | | 474/190 |
| 6,848,757 B2* | 2/2005 | Ueno | ............ | B62D 55/244 |
| | | | | 305/195 |
| 7,094,170 B2* | 8/2006 | Young | ............ | F16H 57/0006 |
| | | | | 474/213 |
| 8,136,827 B2* | 3/2012 | Lumpkin | ............ | F16H 55/171 |
| | | | | 198/834 |
| 8,480,109 B1* | 7/2013 | Adams | ............ | B62M 9/02 |
| | | | | 280/261 |
| 11,608,140 B2* | 3/2023 | Mohrmann | ............ | F16H 7/023 |
| 2002/0119854 A1* | 8/2002 | Mohr | ............ | F16G 1/28 |
| | | | | 474/237 |
| 2007/0105674 A1* | 5/2007 | Hogn | ............ | F16H 7/023 |
| | | | | 474/152 |
| 2011/0049831 A1* | 3/2011 | Lumpkin | ............ | F16H 55/171 |
| | | | | 474/205 |
| 2012/0094795 A1* | 4/2012 | Wang | ............ | F16G 5/20 |
| | | | | 474/205 |
| 2018/0003273 A1* | 1/2018 | Cody | ............ | F16H 7/023 |

\* cited by examiner

SELF-ALIGNING POWER TRANSMISSION BELTS AND SYSTEMS INCORPORATING THE SAME

CROSS-REFERENCE TO RELATED APPLICATIONS

This application claims priority to U.S. Provisional Patent Application No. 63/402,846, entitled "SELF-ALIGNING POWER TRANSMISSION BELTS AND SYSTEMS INCORPORATING THE SAME", filed Aug. 31, 2022, the entirety of which is hereby incorporated by reference.

TECHNICAL FIELD

The present disclosure relates to a self-aligning power transmission belt and a corresponding sprocket. More specifically, the self-aligning belt described herein includes a tooth configuration providing for the elimination of tracking error in belt applications.

BACKGROUND

Belt tracking (i.e., movement of a belt parallel to its axis of rotation) is a common issue experienced by industrial belts, such as power transmission belts. Belt tracking may result from belt designs and/or from variations in manufacturing or applications. When belt tracking occurs, the belt can move outside of the normal parallel path, in which case the belt path becomes helical and will drive the position of the belt to either the inside or outside direction. In some cases, this effect can be extremely damaging to the application or the belt.

One common approach to address belt tracking is to provide flanges on the edges of the sprocket to try and contain the belt into a specific range of locations if tracking develops. However, this approach adds cost to the sprocket, which is the most expensive portion of the system cost, and does not always prevent tracking from damaging the belt. For example, in extreme tracking situations, the belt can ride up the flange and create additional damage to the belt or the system.

Another common approach to address belt tracking is the addition of a center track in the belt. In this approach, a groove or channel running perpendicular to the tooth direction is formed in the belt to allow for meshing to a corresponding track or rail located on the sprocket. The interaction between the belt groove/channel and the sprocket track/rail keeps the belt aligned in application. However, this approach results in removing surface area and volume from the tooth, which reduces the efficiency of the belt by a proportional amount and requires more over-design of the belt for the application through increased dimensions or construction materials. Further, some structural losses are incurred through the division of the single tooth into two unique and smaller teeth.

Accordingly, a need exists for additional belt aligning solutions that do not suffer from some or all of the disadvantages present in the previously known techniques described previously.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a power transmission belt is described, the power transmission belt having an axis of rotation and a direction of travel. The power transmission belt includes a first row of spaced apart teeth, the first row oriented generally parallel to the direction of travel and each of the spaced apart teeth in the first row oriented generally parallel to the axis of rotation, and a second row of spaced apart teeth, the second row oriented generally parallel to the direction of travel and each of the spaced apart teeth in the second row oriented generally parallel to the axis of rotation. The teeth in the second row are offset in a direction generally parallel to the direction of travel from the teeth in the first row.

In some embodiments, a power transmission belt is described, the power transmission belt having an axis of rotation and a direction of travel. The power transmission belt includes a first row of spaced apart teeth, the first row oriented generally parallel to the direction of travel and each of the spaced apart teeth in the first row oriented generally parallel to the axis of rotation, a second row of spaced apart teeth, the second row oriented generally parallel to the direction of travel and each of the spaced apart teeth in the second row oriented generally parallel to the axis of rotation, and a third row of spaced apart teeth, the third row oriented generally parallel to the direction of travel and each of the spaced apart teeth in the third row oriented generally parallel to the axis of rotation. The teeth in the first row are aligned in a direction parallel to the axis of rotation with the teeth in third row and the teeth in the second row are offset in a direction generally parallel to the direction of travel from the teeth in the first row and the teeth in the third row.

In some embodiments, a power transmission system is described. The power transmission system includes a power transmission belt as described in either of the two preceding paragraphs, and at least one sprocket having teeth configured and aligned to mate with the teeth of the power transmission belt.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1A:
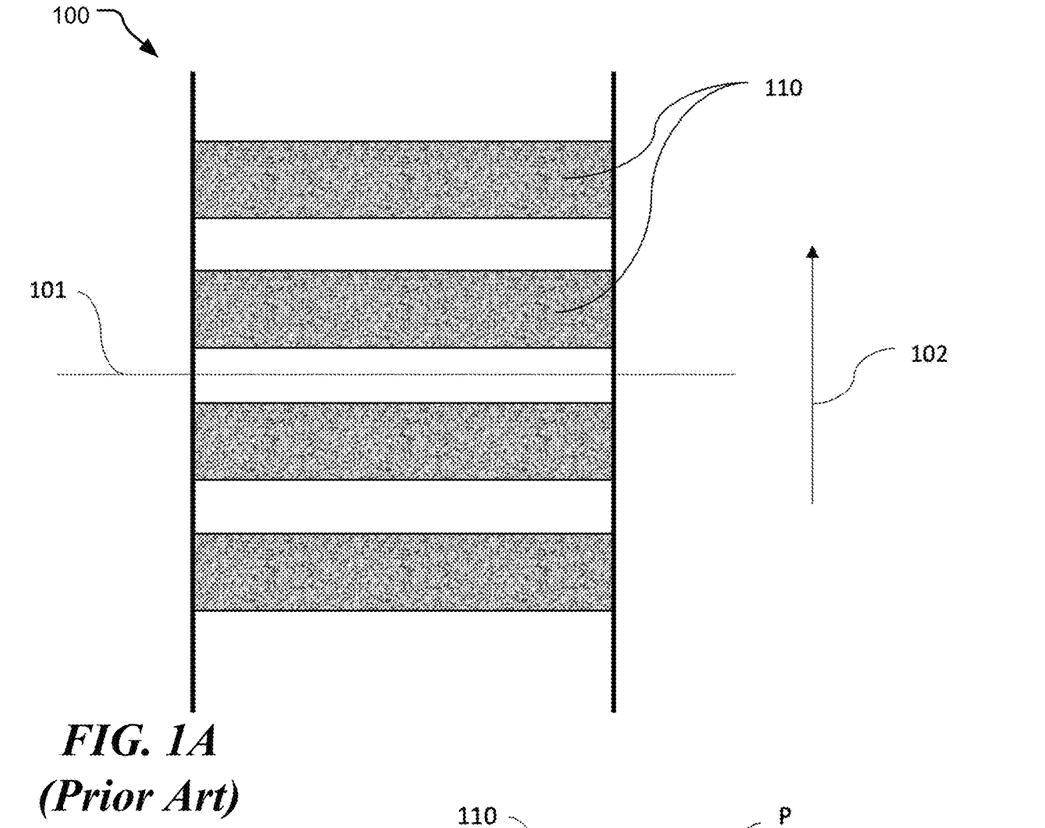
FIG. 1A is a top view of a power transmission belt as known in the prior art.
Figure 1B:
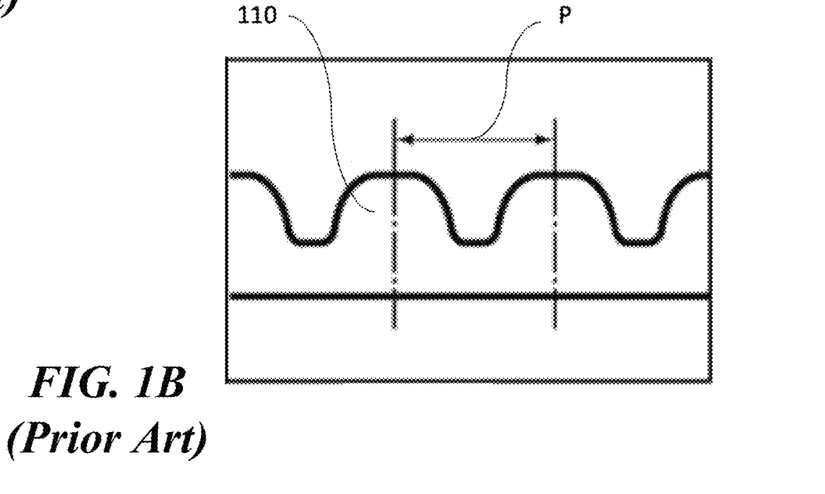
FIG. 1B is a side view of a power transmission belt as known in the prior art.

With reference to FIGS. 1A and 1B, portions of a previously known power transmission belt 100 are shown, the belt 100 generally including a plurality of spaced apart teeth 110, each of which is aligned in a direction generally parallel to the rotational axis 101 of the belt 100. The belt 100 has a direction of movement 102, i.e., the direction the belt moves when driven by one or more sprockets (not shown), the direction of movement 102 being generally perpendicular to the axis of rotation 101.

As shown in FIG. 1A, each tooth 110 extends across the width of the belt 100 in a continuous manner, with no breaks or interruptions in each tooth 110 along its width. FIG. 1B shows a side view of the belt 100 in which the profile of the teeth 110 is illustrated. Each tooth 110 is generally identical in cross-sectional size and dimensions, and the spacing between adjacent teeth 110 is generally constant across the entire length of the belt 100. The gaps or valleys between adjacent teeth 110 is generally where a corresponding tooth on a sprocket engages to propel the belt 100 forward. Also shown in FIG. 1B, the plurality of uniformly spaced teeth 101 include a constant pitch P. Pitch P is the distance between the center of one tooth and the center of an adjacent tooth.

As discussed in greater detail in the Background, belts 100 configured as shown in FIGS. 1A and 1B may suffer from belt tracking in which the belt moves or slides parallel to the axis of rotation, rather than remaining in place with no lateral movement while the belt rotates about its rotational axis. Such tracking is not impeded by the belt configuration shown in FIGS. 1A and 1B at least in part due to the fact that nothing in the tooth profile prevents lateral movement of the belt.

Figure 2:
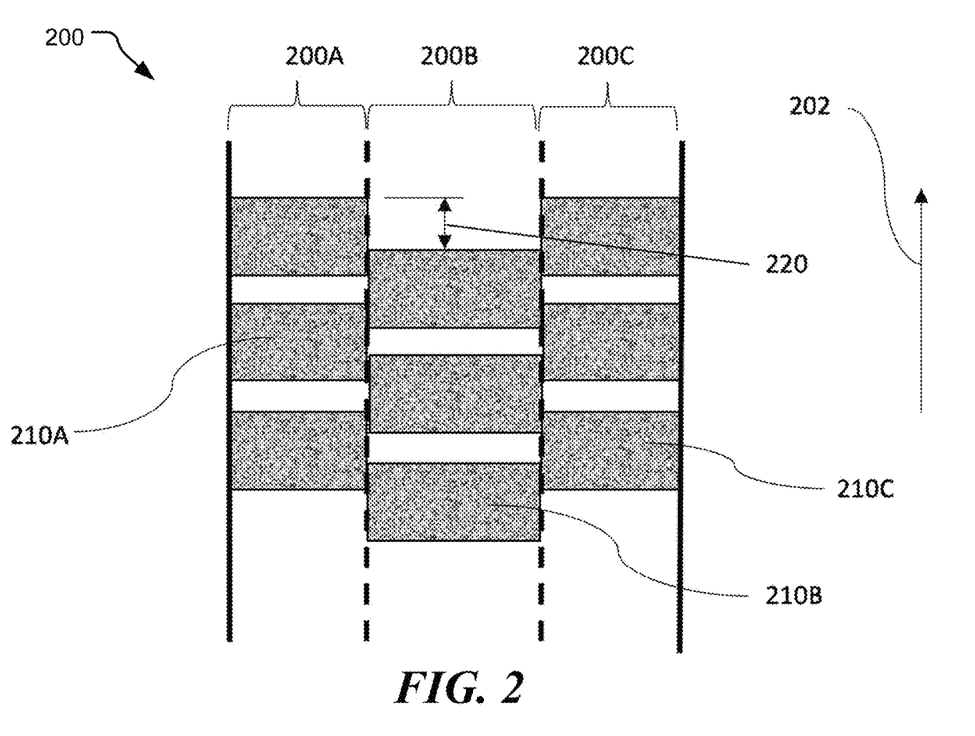
FIG. 2 is a top view of a power transmission belt having self-aligning features configured in accordance with various embodiments described herein.
Figure 3:
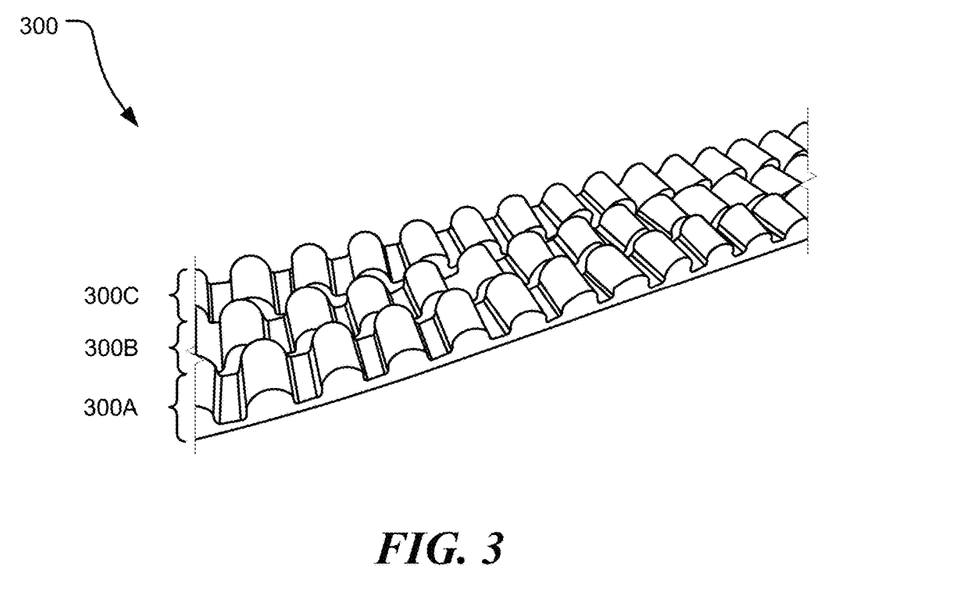
FIG. 3 is a perspective view of a power transmission belt having self-aligning features configured in accordance with various embodiments described herein.

With reference now to FIGS. 2 and 3, embodiments of a power transmission belt 200 are shown in which the tooth profile is arranged to help inhibit and prevent belt tracking. In the belt configuration shown in FIGS. 2 and 3, the belt 200 is generally divided into at least two rows, the rows being oriented parallel to the direction of movement 202. FIG. 2 illustrates a belt 200 having three rows 200A, 200B, 200C, though it should be appreciated the belt may have as few as two rows (see, e.g., FIG. 5), or three or more rows (see, e.g., FIG. 4). In the first row 200A, teeth 210A having identical cross-sectional shapes and dimensions, are spaced along the length of the row 200A at even intervals, and have a width generally equal to the width of row 200A. The width of row 200A is less than the total width of the belt 200 such that teeth 210A do not extend across the entire width of the belt 200.

In a second row 200B, which may be laterally adjacent to the first row 200A, teeth 210B having identical cross-sectional shapes and dimensions, are spaced along the length of the row 200B at even intervals, and have a width generally equal to the width of row 200B. The width of row 200B is less than the total width of the belt 200 such that teeth 210B do not extend across the entire width of the belt 200. In contrast to the belt configuration shown in FIGS. 1A and 1B, however, the teeth 210B in row 200B are offset in a direction parallel to the direction of movement 202 from the teeth 210A in row 200A. The offset 220 is the distance between a leading edge of a tooth 210A in row 200A and the leading edge of a laterally adjacent tooth 210B in row 200B.

Generally speaking, the above configuration can help to inhibit or prevent belt tracking by virtue of the teeth in a given row on the belt 200 impacting the sides of teeth in a laterally adjacent row of a corresponding sprocket when lateral movement of the belt 200 occurs, thus impeding lateral movement of the belt. Put another way, the disclosed configuration, when used with a corresponding sprocket, eliminates a straight-line path that a tooth on the belt can pass through when lateral movement of the belt occurs.

The width of each row provided on the belt 200 is generally not limited. In some embodiments, each row has the same width, while in other embodiments, one or more rows may have a different width than other rows provided on the belt. As shown in FIG. 3, the belt 300 generally includes three rows 300A, 300B, 300C, each row being approximately one third of the width of the belt 300. Furthermore, FIG. 3 illustrates an embodiment where the row 300B including the offset teeth is centered on the width of the belt 300, thus occupying the middle third of the belt 300. However, it should be appreciated that the location of an offset row is not limited to the center of the belt 300. In one example of a non-symmetric configuration (not shown), a first row can have a width that is one third the width of the belt, a third row that is one half the width of the belt, and a second row including offset teeth and positioned between the first and third rows that is one sixth the width of the belt. In this configuration, each row has a different width, and the offset row is not centered on the width of the belt.

In some embodiments, the pitch P is the same in each row provided on the belt, regardless of any offset. The offset 220 can be any value less than one pitch P to thereby ensure the teeth in the offset row are not aligned with the teeth in non-offset rows. In some embodiments, the offset 220 is 25% of the pitch P, 33% of the pitch P, 50% of the pitch P, 66% of the pitch P, or 75% of the pitch P, or any other value less than 100% of the pitch.

In some embodiments, the specific offset 220 used for the offset row is selected such that each tooth in the offset row still contacts at least one tooth in a laterally adjacent row. This is shown in, e.g., FIG. 2, wherein each tooth 210B in row 200B is in contact with at least one tooth 210A in row 200A. In fact, as shown in FIG. 2, each tooth 210B is in contact with two teeth 210A in row 200A. FIG. 3, on the other hand, illustrates a configuration wherein each tooth in row 300B is in contact with one tooth in row 300A. This embodiment wherein the teeth in the offset row are in contact with teeth in the non-offset row helps to ensure that the tooth configuration described herein does not merely provide a plurality of smaller width, independent teeth. At least some volume continuity between the teeth in laterally adjacent rows provides for at least some measure of structural integrity amongst the teeth, which in turn helps to provide the belt with improved durability.

In some embodiments, the cross-sectional shape and dimensions of all teeth in the offset and non-offset rows are identical. For example, every tooth on the belt may have a generally square cross-sectional shape with an identical height and length. Uniformity in teeth shape and dimension helps to maximize the surface area of the belt in contact with the sprocket at any moment. The specific cross-sectional shape and dimensions used are not limited. Exemplary, though non-limiting, examples of suitable cross-sectional shapes include square, chamfered, rounded, etc.

In alternate embodiments, the cross-sectional shape and/or dimensions of the teeth in the offset row or rows may be different from the cross-sectional shape and/or dimensions of the teeth in the non-offset rows. For example, in such an embodiment, the teeth in the non-offset row may have a square cross-sectional shape while the teeth in the offset row may have a rounded cross-sectional shape.

Figure 4:
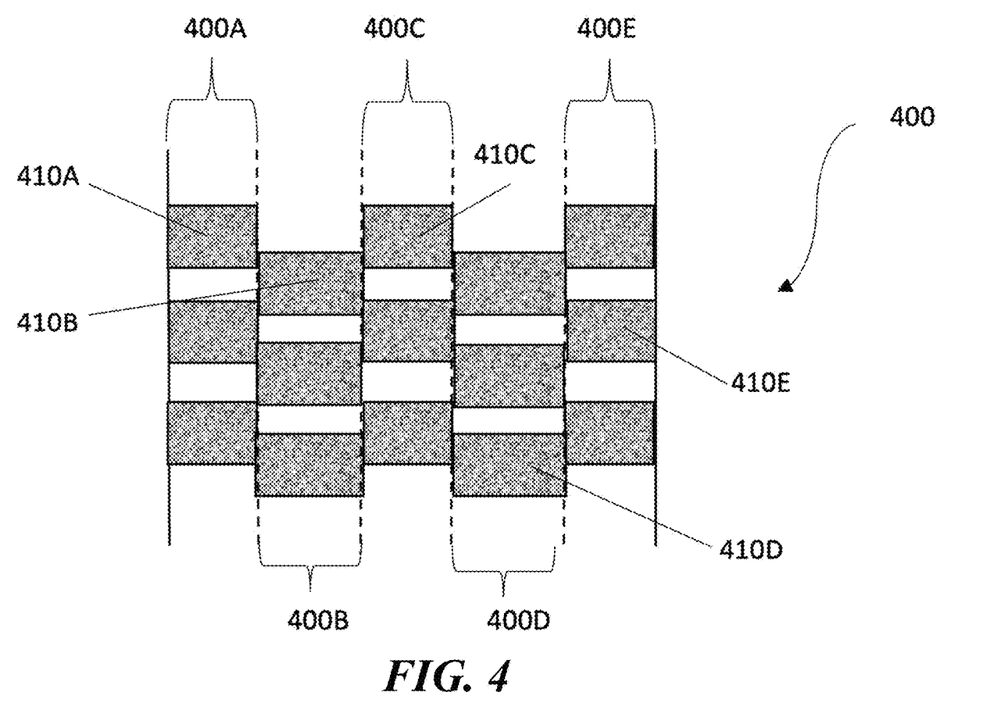
FIG. 4 is a top view of a power transmission belt having self-aligning features configured in accordance with various embodiments described herein.

FIG. 4 illustrates an embodiment similar to the embodiment illustrated in FIG. 2, but wherein the belt 400 includes two offset rows among three non-offset rows, for five rows total in the belt 400. More specifically, belt 400 includes rows 400A, 400B, 400C, 400D and 400E, including spaced apart teeth 410A, 410B, 410C, 410D, and 410E, respectively. The teeth 410B, 410D in rows 400B and 400D are offset in a direction parallel to the direction of travel of belt 400 at a distance less than the pitch of the spaced apart teeth 410A, 410C, 410E in rows 400A, 400C and 400E. As such, FIG. 4 illustrates an embodiment wherein more than one row of spaced apart teeth is offset. FIG. 4 also illustrates that the width of the rows 400A-400E may differ, with rows 400B and 400D being wider than rows 400A, 400C and 400E.

Figure 5:
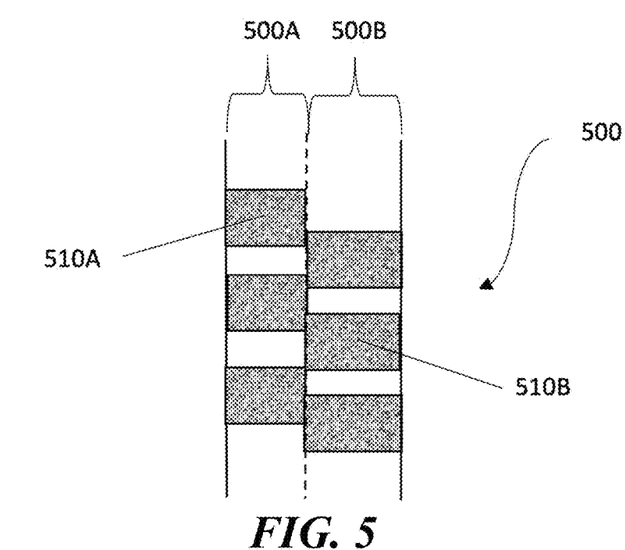
FIG. 5 is a top view of a power transmission belt having self-aligning features configured in accordance with various embodiments described herein.

FIG. 5 illustrates an embodiment wherein the belt 500 includes two rows total, one offset from the other. More specifically, belt 500 includes rows 500A and 500B including spaced apart teeth 510A and 510B, respectively. The teeth 510B in row 500B are offset in a direction parallel to the direction of travel of belt 500 at a distance less than the pitch of the spaced apart teeth 510A in row 500A. As such, FIG. 5 illustrates an embodiment wherein the row of offset spaced apart teeth is not bounded on both sides by a row of non-offset teeth. While FIG. 5 illustrates rows 500A and 500B having differing widths, it should be appreciated that the width of row 500A could be the same as the width of row 500B in alternate embodiments.

Any method of manufacturing the self-aligning belts described herein can be used, provided that the desired offset rows of teeth are provided. In some embodiments, the self-aligning belts as described herein are made using standard belt molding techniques, with the mold including the desired row or rows of offset teeth. In some embodiments, individual rows of teeth are prepared using a common mold, and then rows are sewn together or otherwise attached to each other to form the composite belt structure. The row or rows of teeth intended to provide offset teeth in the belt may be aligned relative to the non-offset rows prior to being sewn or otherwise attached together in order to provide the composite belt with the desired offset row or rows of spaced apart teeth.

In embodiments where teeth in an offset row contact at least one tooth in a non-offset row, molding manufacturing techniques provide some degree of unitary or integral connection between adjacent offset and non-offset teeth, which may thereby provide for better structural integrity as compared to other manufacturing techniques, such where individual rows of teeth are sewn together. Techniques in which individual rows of teeth are sewn or otherwise bound together will still provide the desired contact between teeth in adjacent rows, but these teeth are distinct and do not have material flowing from one tooth to another. The presence of a seam or break between teeth may therefore provide for a less robust structural integrity.

Another manner of manufacturing self-aligning power transmission belts as described herein may include preparing or providing a primary toothed power transmission belt having at least one recess formed therein, the recess being aligned in parallel with the direction of travel of the belt, extending around the entire circumference of the belt, and having a depth that does not exceed the thickness of the primary power transmission belt. By forming at least one recess in the primary power transmission belt in this manner, a secondary toothed belt may be disposed in the recess. The secondary toothed belt that is disposed in the recess may be rotationally positioned within the recess such that the teeth of the secondary toothed belt do not align with the interrupted teeth of the primary power transmission belt to thereby provide at least one offset row of teeth in a similar or identical manner to the embodiments described previously.

Figure 6:
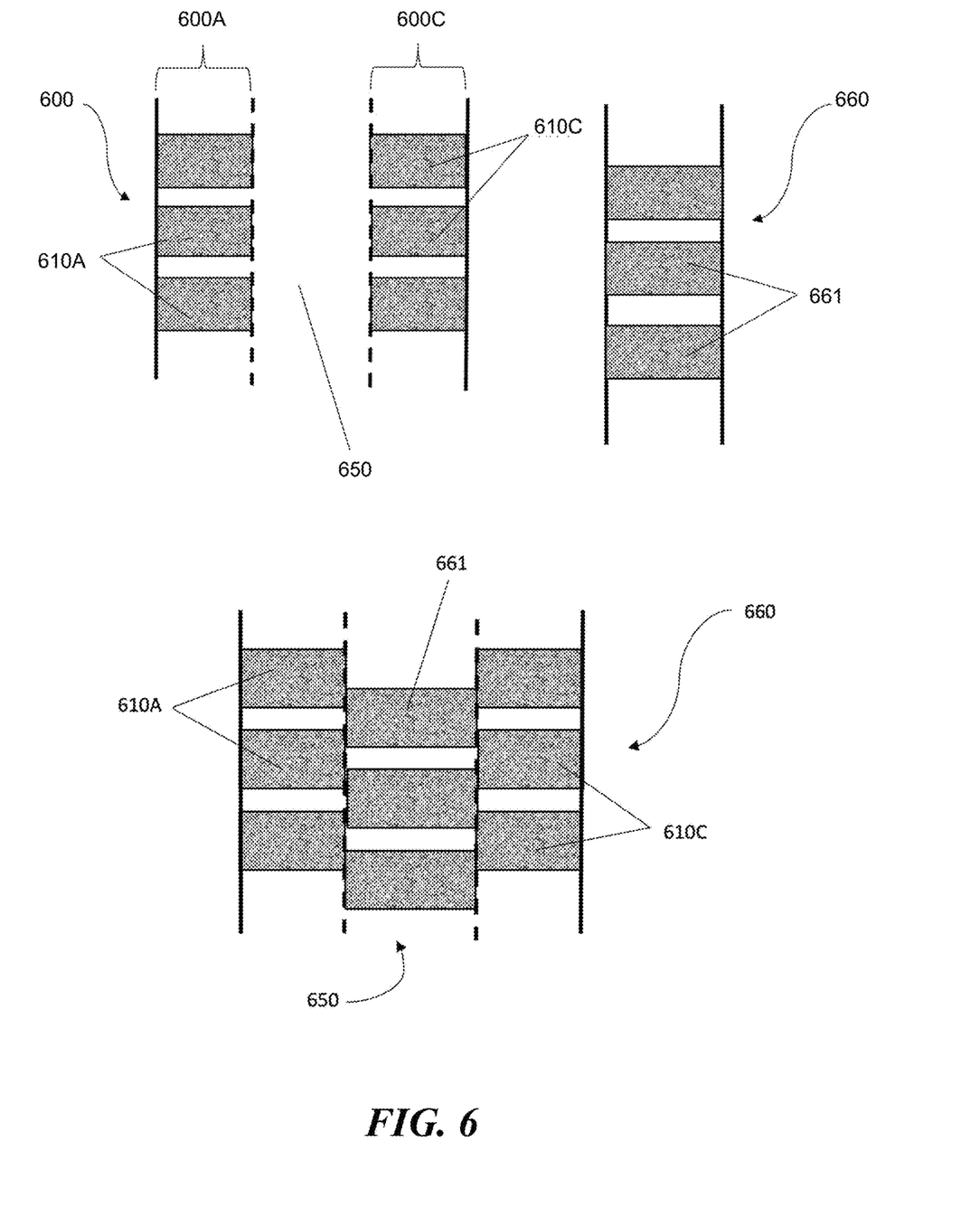
FIG. 6 is a top view of a power transmission belt configured in accordance with various embodiments described herein.

FIG. 6 provides a general illustration of this embodiment. More specifically, FIG. 6 illustrates a primary power transmission belt 600 having a recess 650 formed therein, a secondary toothed belt 660, and a composite power transmission belt 670 made from disposing secondary toothed belt 660 in recess 650 of primary power transmission belt 600.

Similar to the power transmission belt 200 shown in FIG. 2, the primary power transmission belt 600 includes a first row 600A of teeth 610A and a third row 600C of teeth 610C. However, rather than including a second row 200B of teeth 210B as shown in FIG. 2, the primary power transmission belt 600 at least initially includes a recess 650 where no teeth are provided. While teeth 610A in first row 600A are aligned with the teeth 610C in third row 600C in a direction parallel to the axis of rotation of the primary power transmission belt 600, and may have the same cross-sectional shape, size and dimensions, the teeth 610A and 610C do not extend across the entire width of the primary power transmission belt 600 because of the presence of recess 650.

Primary power transmission belt 600 may include recess 650 by virtue of being molded using a mold that creates recess 650, or recess 650 may be formed by removing a portion of teeth provided in a preliminary version of primary power transmission belt 600. For example, primary power transmission belt 600 may be formed by taking a belt similar to belt 100 shown in FIG. 1A and removing a central portion of the teeth 110 to thereby create the recess 650.

Regardless of the manner in which recess 650 is formed, recess 650 is generally provided such that its depth does not exceed the thickness of the primary power transmission belt 600. In some embodiments, the depth of the recess 650 is such that the floor of recess 650 is at or below the lowest point of the valley between adjacent teeth 610 in the same row of primary power transmission belt 600. In some embodiments where the power transmission belt 600 includes a backing layer upon which the teeth 610 are formed, the recess 650 extends to the backing layer such that there is no teeth material in the recess 650.

The width of recess 650 is generally not limited. As shown in FIG. 6, the recess 650 is generally about one third the width of the primary power transmission belt 600. However, the recess 650 may be greater or smaller than this amount. Similarly, while FIG. 6 illustrate a single recess 650 formed in the primary power transmission belt 600, it should be appreciated that the primary power transmission belt 600 may include more than one recess 650.

Secondary toothed belt 660 is generally configured in such a way that the secondary toothed belt 660 may be disposed in the recess 650 of primary power transmission belt 600. In some embodiments, the width of the secondary toothed belt 660 may be approximately equal to the width of recess 650 such that the secondary toothed belt 660 occupies substantially all of the width of the recess 650 when disposed therein. In some embodiments, the width of the secondary toothed belt 660 may be such that when disposed in the recess 650, the sides of the teeth 661 of secondary toothed belt 660 contact the sides of teeth 610 in primary power transmission belt 600.

The secondary toothed belt 660 can also be configured to have an inner diameter that is approximately equal to the diameter of the primary power transmission belt 600 at the recess 650. In this manner, the inner diameter of the secondary toothed belt 660 directly abuts the floor of the recess 650. In some embodiments, the inner diameter of the secondary toothed belt 660 can sufficiently match diameter of the primary power transmission belt 600 in the recess that no additional fasteners are required in order to secure secondary toothed belt 660 to primary power transmission belt 600. Regardless of this fit, fasteners, such as glue or adhesives, can be used to further secure the secondary toothed belt 660 to the primary power transmission belt 600.

The size, shape, dimensions, number, spacing and profile of the teeth 661 of secondary toothed belt 660 are generally not limited provided that when the secondary toothed belt 660 is disposed in the recess of 650 of primary power transmission belt 600 the orientation, shape, size, spacing, etc., of teeth 660 help to inhibit the lateral movement of the composite belt 670 when engaged with a sprocket. As shown in FIG. 6, the teeth 661 are generally configured to be similar or identical to the teeth 610A, 610B of primary power transmission belt 600 in terms of shape, cross-section profile, spacing and dimensions. In such embodiments where teeth 661 are similar or identical to teeth 610A, 610C, the composite belt 670 closely or exactly resembles the configuration of the belt shown in FIGS. 2 and 3. In order to provide the desired inhibition on lateral movement of the belt 670 when engaged with a sprocket, such embodiments where teeth 661 are identical to teeth 610A, 610C requires that the secondary toothed belt 660 be disposed in the recess 650 such that teeth 660 are not aligned with teeth 610A, 610C in the direction parallel to the axis of rotation of the composite belt 670. That is to say, the secondary toothed belt 660 is rotationally offset from primary power transmission belt 600 such that the teeth 661 are not aligned with teeth 610A, 610C.

Figure 7:
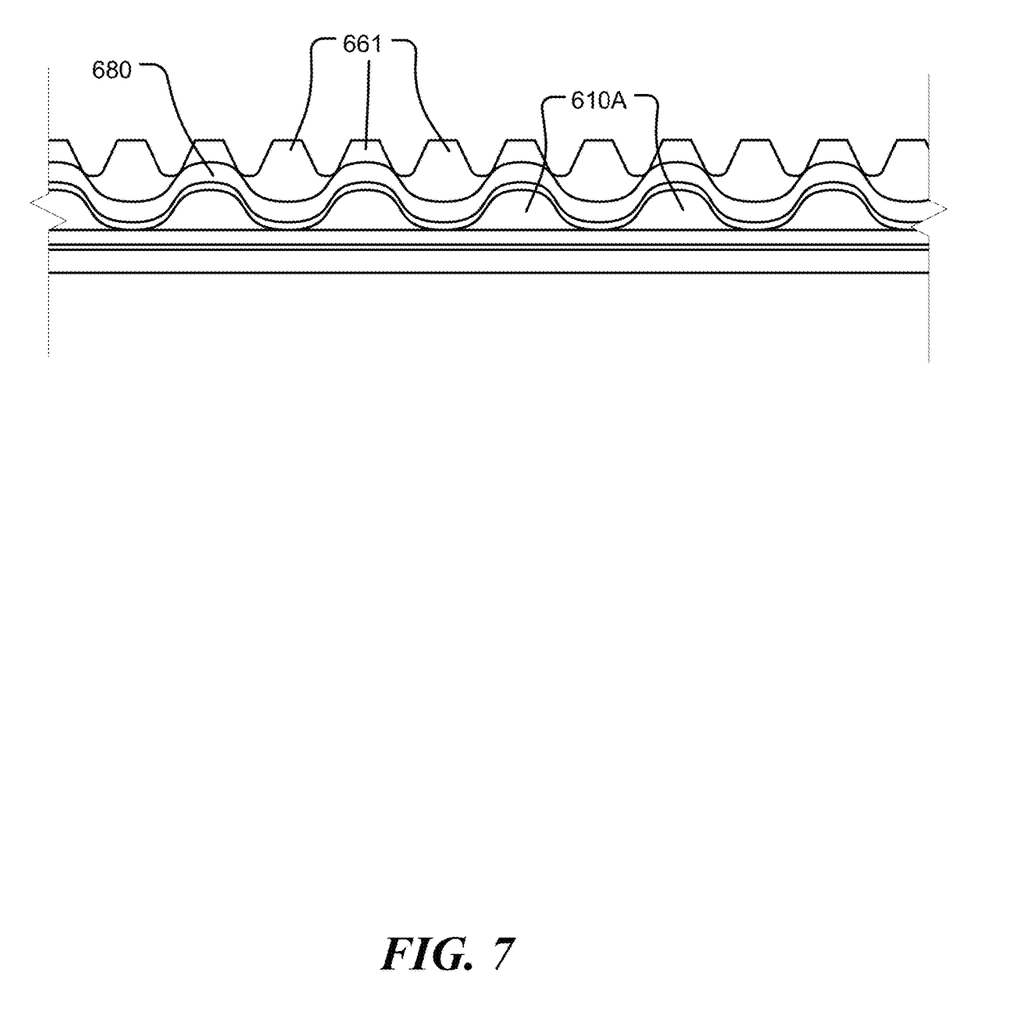
FIG. 7 is a side view of a power transmission belt configured in accordance with various embodiments described herein.

While teeth 660 may be similar or identical to teeth 610A, 610C in some embodiments, it should be appreciated that teeth 661 need not be identical to teeth 610A, 610C. For example, as compared to teeth 610A, 610C, teeth 661 may have a different profile, different dimensions, different size, and/or difference spacing. FIG. 7 provides an illustration of an embodiment where the teeth 661 of secondary toothed belt 660 are substantially different from teeth 610A, 610C of primary power transmission belt 600 in several respects. For example, FIG. 7 shows teeth 661 that are taller, thinner, and spaced closer together than teeth 610A. FIG. 7 illustrates how despite the differences between teeth 661 and 610A, teeth 661 are positioned relative to teeth 610A, 610C such that they will still effectively inhibit lateral movement of the composite belt 670 when engaged with a sprocket.

The materials used in the formation of the primary power transmission belt 600 and the secondary toothed belt 660 are generally not limited. With respect to the material used for the teeth 610A, 610C of primary power transmission belt 600 and the teeth 661 of secondary toothed belt, the material of the teeth 610A, 610C and 661 may be the same material, or the material of teeth 610A, 610C may be different from the material used for teeth 661. Furthermore, additional layers may or may not be provided on any of teeth 610A, 610C, and 661. As shown in FIG. 7, a cover layer 680 is provided on teeth 610A, while teeth 661 do not include a cover layer.

With implementation of the above-described embodiments, several advantages may be achieved, including: the elimination or mitigation of belt tracking; increased power transfer efficiency by increased surface area, compared to, e.g., center track belts; increased power transfer efficiency by increased surface area compared to standard toothed belts by using non-aligned tooth patterns; the ability to use narrower belts and/or the reduction in the material types or amounts used in a belt due to the aforementioned increases in power transfer efficiency; and more continuous power transfer from an increased number of teeth engaged with the sprocket at any moment in time.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A power transmission belt having an axis of rotation and a direction of travel, comprising:
    a first row of spaced apart teeth, the first row oriented generally parallel to the direction of travel and each of the spaced apart teeth oriented generally parallel to the axis of rotation, the first row of spaced apart teeth having a width less than the width of the power transmission belt; and
    a second row of spaced apart teeth, the second row oriented generally parallel to the direction of travel and each of the spaced apart teeth oriented generally parallel to the axis of rotation, the second row of spaced apart teeth having a width less than the width of the power transmission belt;
    wherein the teeth in the second row are offset in a direction generally parallel to the direction of travel from the teeth in the first row; and
    wherein the offset of the second row of spaced apart teeth from the first row of spaced apart teeth is less than half a pitch of the first row of spaced apart teeth.

2. The power transmission belt of claim 1, wherein each tooth in the first row of spaced apart teeth is in contact with at least one tooth in the second row of spaced apart teeth.

3. The power transmission belt of claim 1, wherein the second row of spaced apart teeth is centered on the width of the power transmission belt.

4. The power transmission belt of claim 3, wherein a side edge of the first row of spaced apart teeth serves as a side edge of the power transmission belt.

5. The power transmission belt of claim 1, wherein the sum of the width of the first row and the width of the second row is equal to the width of the power transmission belt.

6. The power transmission belt of claim 1, wherein the cross-sectional shape and dimensions of each tooth and the spacing between teeth in the first row of spaced apart teeth is identical to the cross-section shape and dimensions of each tooth and the spacing between teeth in the second row of spaced apart teeth.

7. A power transmission belt having an axis of rotation and a direction of travel, comprising:
    a first row of spaced apart teeth, the first row oriented generally parallel to the direction of travel and each of the spaced apart teeth oriented generally parallel to the axis of rotation, the first row of spaced apart teeth having a width less than the width of the power transmission belt; and
    a second row of spaced apart teeth, the second row oriented generally parallel to the direction of travel and each of the spaced apart teeth oriented generally parallel to the axis of rotation, the second row of spaced apart teeth having a width less than the width of the power transmission belt;
    wherein the teeth in the second row are offset in a direction generally parallel to the direction of travel from the teeth in the first row; and
    wherein the cross-sectional shape of each tooth in the first row of spaced apart teeth is different from the cross-sectional shape of each tooth in the second row of spaced apart teeth.

8. A power transmission belt having an axis of rotation and a direction of travel, comprising:
    a first row of spaced apart teeth, the first row oriented generally parallel to the direction of travel and each of the spaced apart teeth oriented generally parallel to the axis of rotation, the first row of spaced apart teeth having a width less than the width of the power transmission belt;
    a second row of spaced apart teeth, the second row oriented generally parallel to the direction of travel and each of the spaced apart teeth oriented generally parallel to the axis of rotation, the second row of spaced apart teeth having a width less than the width of the power transmission belt; and
    a third row of spaced apart teeth, the third row oriented generally parallel to the direction of travel and each of the spaced apart teeth oriented generally parallel to the axis of rotation, the third row of spaced apart teeth having a width less than the width of the power transmission belt;
    wherein the teeth in the first row are aligned in a direction parallel to the axis of rotation with the teeth in third row;
    wherein the teeth in the second row are offset in a direction generally parallel to the direction of travel from the teeth in the first row and the teeth in the third row; and
    wherein the offset of the second row of spaced apart teeth from the first row of spaced apart teeth and the third row of spaced apart teeth is less than half the pitch of the first row of spaced apart teeth and the third row of spaced apart teeth.

9. The power transmission belt of claim 8, wherein each tooth in the second row of spaced apart teeth is in contact with at least one tooth in the first row of spaced apart teeth and at least one tooth in the third row of spaced apart teeth.

10. The power transmission belt of claim 8, wherein the second row of spaced apart teeth is centered on the width of the power transmission belt.

11. The power transmission belt of claim 10, wherein a side edge of the first row of spaced apart teeth serves as a first side edge of the power transmission belt and a side edge of the third row of spaced apart teeth serves as a second side edge of the power transmission opposite the first edge of the power transmission belt.

12. The power transmission belt of claim 8, wherein the second row has a width that is approximately one third of width of the power transmission belt.

13. The power transmission belt of claim 8, wherein the sum of the width of the first row, the width of the second row, and the width of the third row is equal to the width of the power transmission belt.

14. The power transmission belt of claim 8, wherein the cross-sectional shape and dimensions of each tooth and the spacing between teeth in the second row of spaced apart teeth is identical to the cross-section shape and dimensions of each tooth and the spacing between teeth in the first row of spaced apart teeth and the third row of spaced apart teeth.

15. A power transmission belt having an axis of rotation and a direction of travel, comprising:
    a first row of spaced apart teeth, the first row oriented generally parallel to the direction of travel and each of the spaced apart teeth oriented generally parallel to the axis of rotation, the first row of spaced apart teeth having a width less than the width of the power transmission belt;
    a second row of spaced apart teeth, the second row oriented generally parallel to the direction of travel and each of the spaced apart teeth oriented generally parallel to the axis of rotation, the second row of spaced apart teeth having a width less than the width of the power transmission belt; and a third row of spaced apart teeth, the third row oriented generally parallel to the direction of travel and each of the spaced apart teeth oriented generally parallel to the axis of rotation, the third row of spaced apart teeth having a width less than the width of the power transmission belt;

wherein the teeth in the first row are aligned in a direction parallel to the axis of rotation with the teeth in third row;

wherein the teeth in the second row are offset in a direction generally parallel to the direction of travel from the teeth in the first row and the teeth in the third row; and wherein the cross-sectional shape of each tooth in the second row of spaced apart teeth is different from the cross-sectional shape of each tooth in the first row of spaced apart teeth and the third row of spaced apart teeth.

16. A composite power transmission belt having an axis of rotation and a direction of travel, comprising:

a primary power transmission belt comprising:

a first row of spaced apart teeth, the first row oriented generally parallel to the direction of travel and each of the spaced apart teeth oriented generally parallel to the axis of rotation, the first row of spaced apart teeth having a width less than the width of the power transmission belt;

a third row of spaced apart teeth, the third row oriented generally parallel to the direction of travel and each of the spaced apart teeth oriented generally parallel to the axis of rotation, the third row of spaced apart teeth having a width less than the width of the power transmission belt; and a recess located between the first row of spaced apart teeth and the third row of spaced apart teeth, the recess having a recess width; and a secondary toothed belt comprising:

a series of spaced apart teeth oriented generally parallel to the axis of rotation, each tooth in the series of spaced apart teeth extending across the width of the secondary toothed belt;

wherein the width of the secondary toothed belt is approximately equal to the recess width and the secondary toothed belt is disposed in the recess such that the teeth of the secondary toothed belt are substantially unaligned with the teeth of the first row of spaced apart teeth and the third row of spaced apart teeth in a direction generally parallel to the axis of rotation.

* * * * *